United States Patent

[11] 3,600,002

[72] Inventor Dale D. Benwell
 4325 Cerritos, Long Beach, Calif. 90807
[21] Appl. No. 883,110
[22] Filed Dec. 8, 1969
[45] Patented Aug. 17, 1971

[54] AUTOMOTIVE REAR END LOWERING DEVICE
 6 Claims, 5 Drawing Figs.
[52] U.S. Cl. .................................................. 280/124,
 180/22, 180/73, 267/48
[51] Int. Cl. .................................................. B60g 11/36
[50] Field of Search .......................................... 280/124;
 180/22 D, 22 E, 73; 267/48

[56] References Cited
UNITED STATES PATENTS
3,104,118 9/1963 Walker ...................... 180/73 X
1,784,128 12/1930 Bernaerts ................... 267/48

Primary Examiner—Philip Goodman
Attorney—William C. Babcock

ABSTRACT: A pair of spring-loaded devices that may be removably mounted in laterally spaced relationship on an automotive vehicle having a semielliptic leaf spring supported rear axle housing to lower the rear end portion of said vehicle relative to the rear wheels thereof and impart a desired customized appearance to said vehicle, as well as improving the cornering ability and riding qualities of the vehicle.

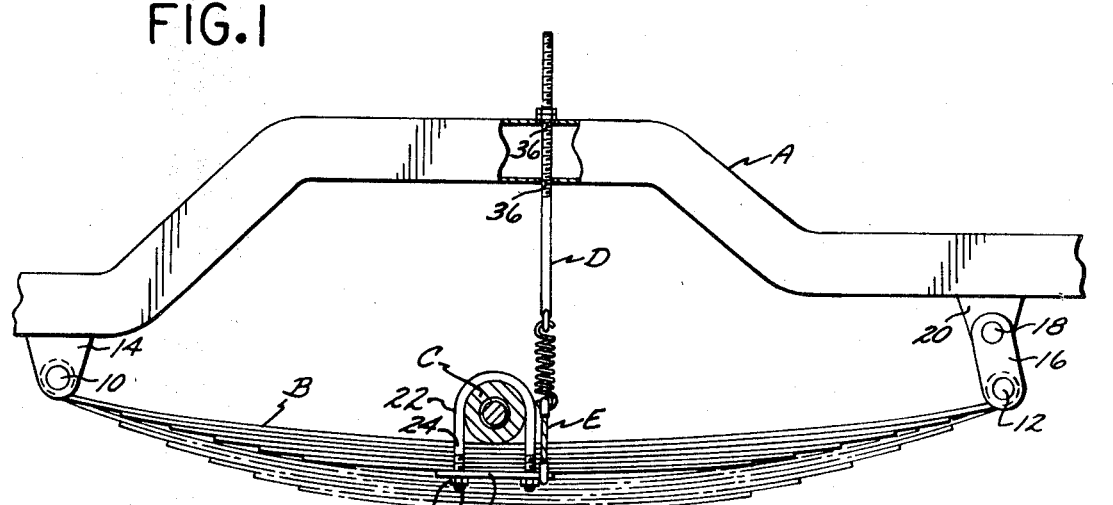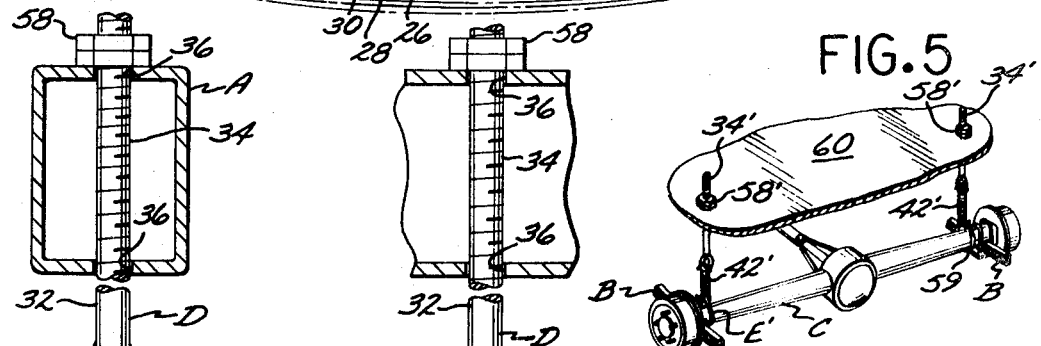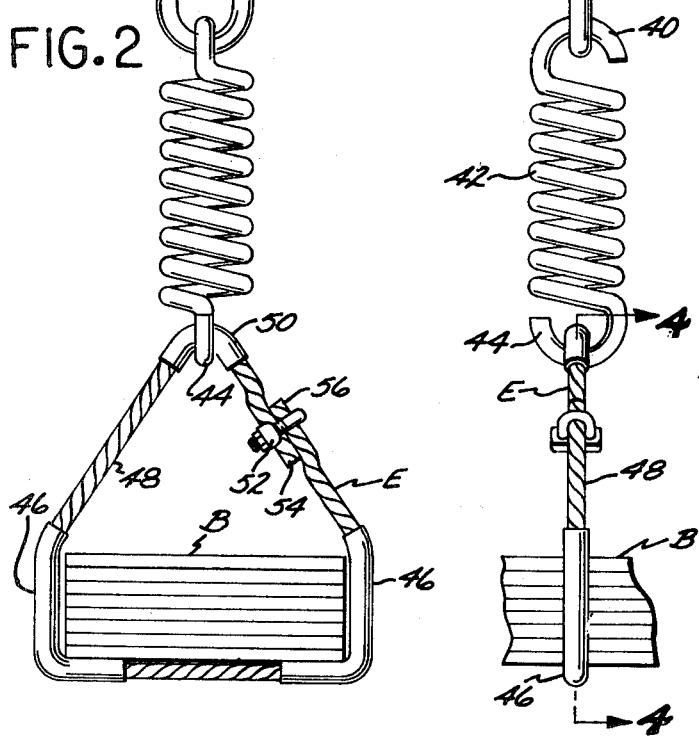

3,600,002

AUTOMOTIVE REAR END LOWERING DEVICE

BACKGROUND OF THE INVENTION

1. Field of the Invention a pair of devices that may be removably mounted on an automotive vehicle to lower the rear portion of the body thereof relative to the rear wheels.

2. Description of the Prior Art

In the customizing of automotive vehicles it is often desirable to lower the rear end portion of the chassis relative to the rear wheels to improve the appearance of the vehicle. Such lowering of the rear end of a vehicle has in the past been commonly accomplished by interposing blocks between the spring saddles and the upper central portions of the semielliptic springs. Such an operation is not only difficult but dangerous to carry out. The purpose of the present invention is to supply means that are easily attached to an automotive vehicle by a person having limited mechanical ability, and by the use of commonly available hand tools lower the rear body portion of a vehicle a desired degree relative to the rear wheels thereof.

SUMMARY OF THE INVENTION

A pair of laterally spaced elongate spring-loaded members that have stirrups on the lower ends that may removably engage the rear axle housing or portions of the semielliptic springs adjacent thereto, with the upper end portions of said members having threads formed thereon. The threaded portions of the elongate members extend through openings in the sidepieces of the frame of the vehicle or openings in a portion of the body that extends between said sidepieces. Nuts are provided that engage said threaded portions. When said nuts are tightened to bear against the upper portions of said sidepieces or the portion of said body extending therebetween, the semielliptic springs are deformed upwardly, with the extent of this upward distortion being the degree to which the rear portion of the vehicle is lowered relative to the rear wheels thereof.

A major object of the present invention is to supply means that may be removably mounted on the rear portion of an automotive vehicle to lower the same relative to the rear wheels thereof by a person having limited mechanical ability, and with but the use of commonly available hand tools.

Another object of the invention is to supply a pair of laterally spaced rear end automotive body lowering devices that have an extremely simple mechanical structure, and not only serve to lower the rearward portion of said body but improve the cornering ability of the vehicle on which they are mounted by lowering the center of gravity thereof, also improving the riding qualities of the vehicle.

BRIEF DESCRIPTION OF THE DRAWINGS

FIG. 1 is a side elevational view of the rear portion of an automotive frame and semielliptic spring associated therewith, with the body-lowering device extending between the frame and spring to deform the spring upwardly to lower the frame relative to the rear wheels of the vehicle (not shown);

FIG. 2 is combined elevational and transverse cross-sectional view of a portion of the device extending between the frame and semielliptic spring;

FIG. 3 is a side elevational view of a part of a rear portion of a vehicle on which the device is mounted;

FIG. 4 is a front elevational view of the stirrup that transversely engages the semielliptic spring; and FIG. 5 is a perspective view of the rear axle housing of a vehicle engaged by an alternate form of the device, which device extends upwardly from said axle housing to engage a portion of the body of the vehicle located between side pieces (not shown) of the vehicle frame.

DESCRIPTION OF THE PREFERRED EMBODIMENTS

In FIG. 1 a section of a rear portion of a sidepiece A of an automotive frame is shown that has a semielliptic spring B situated therebelow. The spring B as is conventional with such devices has eyes (not shown) formed on the upper leaf that are pivotally engaged by pins 10 and 12. The forwardly disposed pin 10 extends between two laterally spaced lugs 14 that are secured to the frame A. The pin 12 extends two links 16 that are pivotally secured on their upper ends by a third pin 18 that is supported on their upper ends by a third pin 18 that is supported from the frame A by downwardly extending members 20 as is conventional in present day automotive construction.

A rear axle housing C as shown in section in FIG. 1 and has a U-bolt 22 extending therearound, which U-bolt projects through spaced downwardly extending openings 24 formed in the spring B. The lower central portion of the spring B is contacted by a bar 26 that has openings (not shown formed therein, through which threaded portions 28 of the U-bolt 22 extend. The threaded portions 28 are engaged by nuts 30 to hold the bar 26 in pressure contact with the spring B and to maintain the spring B at all times in abutting contact with the rear axle housing C.

The invention D as best seen in FIGS. 1—3 inclusive, includes two laterally spaced elongate rods 32 that have threads 34 formed on the upper portions thereof. The threaded portions 34 each extend upwardly through two vertically aligned openings 36 that are drilled into the frame sidepieces A. Each rod 32 has an eye 38 welded or otherwise secured to the lower end thereof. Each eye 38 is engaged by a hook 40 formed on the upper portion of a stiff helical spring 42 as best seen in FIG. 3.

The lower end of each spring 42 defines a second hook 44 which engages a stirrup E that extends transversely around the central portion of one of the semielliptic rear springs B. Each stirrup E includes two laterally spaced tubular L-shaped members 46 formed from a hard metallic material that engage portions of the bottom of one of the springs B and the sides thereof. These tubular members 46 are engaged by a loop 48 of steel cable. The loop 48 extends through an arcuate segment of hard metallic tubing 50 as shown in FIG. 2, with this arcuate segment being engaged by the hook 44. A clamp 52 of conventional design is provided that removably engages the two free ends 54 and 56 of loop 48 to secure the free ends together as shown in FIG. 2.

The upper threaded portion 34 of each rod 32 is engaged by a nut 58. When nuts 58 are rotated relative to frame sidepieces A in a direction to bear thereagainst, the rods 32 are moved upwardly relative to the frame to deform the springs B upwardly, and move the springs from the position shown in phantom line in FIG. 1 to that shown in solid line in the same figure. The degree to which the spring B are deformed upwardly as previously described is the extent to which the frame sidepieces A and automotive body (not shown) supported thereon will be lowered relative to the rear wheels (not shown) of the vehicle.

An alternate form of the invention D is shown in FIG. 5, that is identical with the form D previously described other than that the stirrups E are merely cable loops 59 that engage portions of the rear axle housing C adjacent to the springs B. The balance of the inventions D are identified on the drawing by the same numerals as used in connection with the first form D of the device but to which primes have been added. The threaded portions 34' extend through openings (not shown) in a portion of the vehicle body 60 that extends between sidepieces (not shown) of the frame thereof. When the nuts 58' are rotated in an appropriate direction they bear against the body portion 60, and move the rods 32', springs 42', and stirrups E' and rear axle housing C upwardly relative to the frame sidepieces A. The same result is achieved as when the first form D of the invention is used.

The use and operation of the two forms of the invention will be obvious from the prior description thereof and further description thereof is not necessary.

I claim:

1. In combination with an automotive vehicle incorporating a frame, a rear axle housing, a pair of semielliptic springs secured to rear side portions of said frame and extending under said axle housing, and two U-bolts extending around said housing and through openings formed in said springs to secure said springs to said housing, a device for lowering the normal height of said frame relative to said rear axle housing, which device includes:
   a. two laterally spaced, upwardly extending elongate rigid members movably supported from sidepieces of said frame or a portion of the body of said vehicle that extends between said sidepieces, which members are substantially vertically aligned with the centerline of said housing and disposed thereabove;
   b. first means for moving said member upwardly relative to said frame;
   c. two helical springs depending from the lower ends of said members; and
   d. second means for securing the lower ends of said spring to either said axle housing or said semielliptic springs, with said rigid member when moved upwardly by said first means deforming said semielleptic springs upwardly to lower said frame to a desired degree relative to said axle housing.

2. A device as defined in claim 1 wherein said elongate members include threaded portions that extend through openings in said sidepieces of said frame or a portion of the body of said vehicle that extends between said sidepieces, with said first means comprising a plurality of nuts that engage said threaded portions above said frame and bear against said sidepieces on said portion of said body between said sidepieces when said nuts are rotated in a direction to deform said semielliptic springs upwardly.

3. A device as defined in claim 2 wherein said threaded portions are disposed in openings in said portion of said body that extends between said sidepieces and said helical springs having hooks on the lower ends thereof, with said second means comprising two loops of cable that engage said hooks and said axle housing.

4. A device as defined in claim 2 wherein said threaded portions are disposed in openings in said sidepieces of said frame and on which helical springs are provided on the lower ends thereof, with said second means being two loops of cable that extend transversely about said semielliptic springs adjacent said U-bolts.

5. A device as defined in claim 4 which further includes:
   e. two pairs of generally L-shaped metallic tubes that are so mounted on the loops that the cable defining said loops do not contact said semielliptic springs.

6. A device as defined in claim 4 which further includes:
   f. two arcuate metallic tubes mounted on the upper portions of said loops, which tubes are engaged by said hooks.